United States Patent [19]

Pierce

[11] 4,264,099
[45] Apr. 28, 1981

[54] WIND DEFLECTOR

[76] Inventor: Larry L. Pierce, Flagview Park, 1-A, Douglasville, Ga. 30134

[21] Appl. No.: 666,752

[22] Filed: Mar. 15, 1976

[51] Int. Cl.³ .............................................. B62D 39/00
[52] U.S. Cl. ..................................................... 296/1 S
[58] Field of Search ........................... 296/1 S, 91, 94; 105/2 A, 2 R, 2 B

[56] References Cited

U.S. PATENT DOCUMENTS

| Re. 28,652 | 12/1975 | Bildfell | 296/1 S |
|---|---|---|---|
| 3,768,854 | 10/1973 | Johnson | 296/1 S |
| 3,904,236 | 9/1975 | Johnson | 296/1 S |
| 3,947,065 | 3/1976 | Geiger | 296/1 S |

FOREIGN PATENT DOCUMENTS 16229 of 1915 United Kingdom ....................... 296/91

*Primary Examiner*—Robert R. Song
*Attorney, Agent, or Firm*—Jones, Thomas & Askew

[57] ABSTRACT

A wind deflector assembly is mounted on a towing vehicle for deflecting the relative wind upwardly about a larger towed vehicle and comprises a deflector plate positioned at an angle inclined upwardly and rearwardly with respect to the normal forward direction of movement of the towing vehicle, and includes a lower leading edge portion extending approximately into the normal forward direction of movement of the towing vehicle and an upper trailing edge portion extending approximately opposite to the normal forward direction of movement of the towing vehicle. Triangular braces are connected to the deflector plate at positions displaced from the ends of the deflector plate, and a tie rod is connected at its end to the triangular braces to prevent the triangular braces from spreading apart. Support feet and straps are connected to the braces for mounting the assembly on the upper surface of the towing vehicle.

5 Claims, 4 Drawing Figures

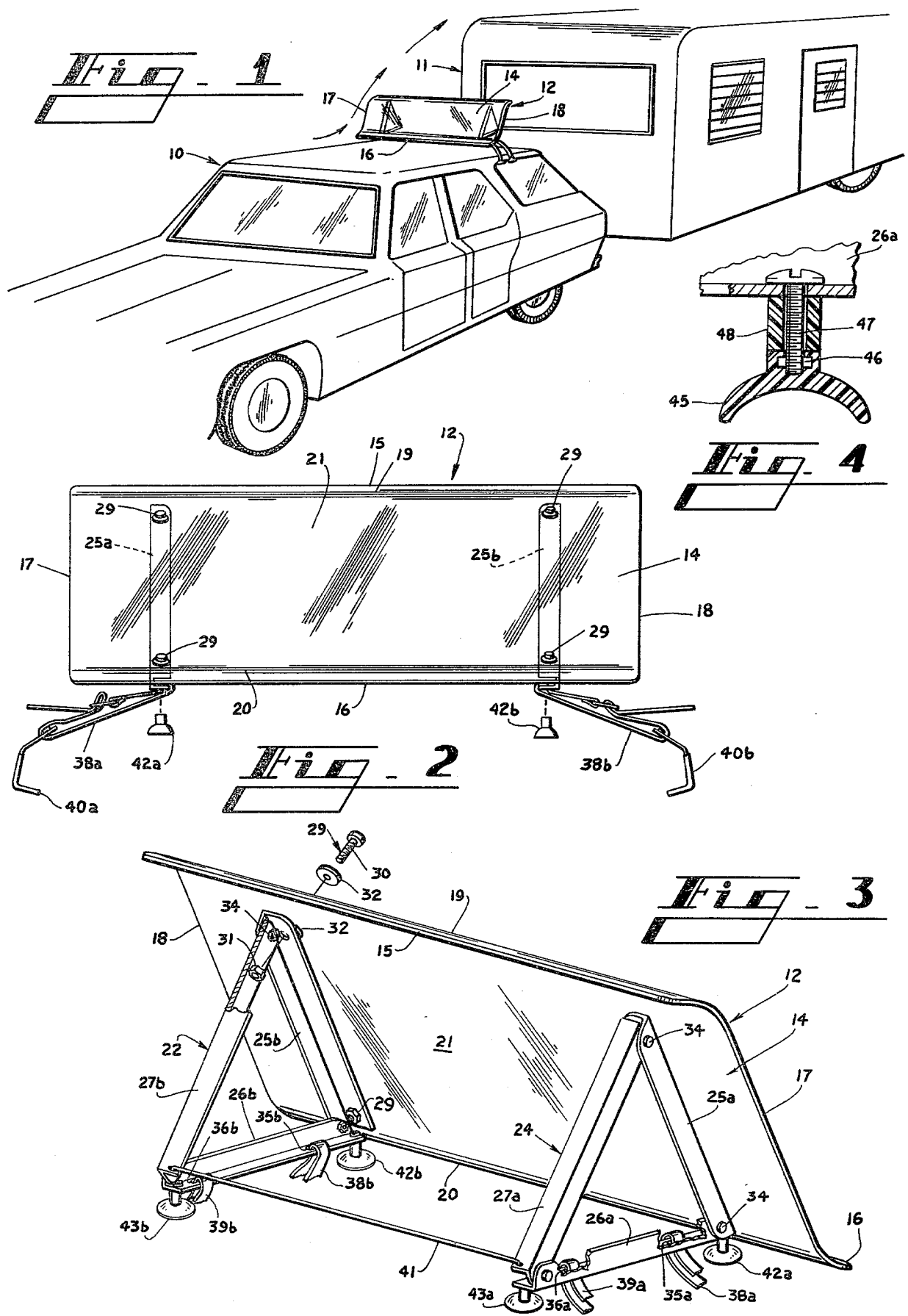

WIND DEFLECTOR

BACKGROUND OF THE INVENTION

When an automobile or similar self-propelled vehicle is used for towing a larger vehicle, such as a house trailer or other relatively large towed vehicle, the surfaces of the larger towed vehicle which extend higher than the height of the automobile encounter a substantial amount of wind resistance when being towed which usually lowers the gas mileage of the automobile and requires more towing power. Also, insects and other airborne objects tend to strike the leading end of the towed vehicle and leave a residue on the towed vehicle which is unsightly and sometimes difficult to remove.

While various wind deflectors and other devices have been used in the past for the purpose of deflecting the relative wind over or about the protruding surfaces of a towed vehicle, the prior art devices have been expensive to construct in that they require various braces and other strengthening aids to rigidify the wind deflector and to maintain the wind deflector in a stable condition on the towing vehicle.

SUMMARY OF THE INVENTION

Briefly described, the present invention comprises a wind deflector assembly for a towing vehicle or the like wherein a single sheet or plate is mounted on the towing vehicle at an angle inclined upwardly and rearwardly from the towing vehicle and which forms a wind deflecting surface. The deflector plate is approximately rectangular and extends across the length of the towing vehicle, and its lower leading edge portion is angled with respect to its main portion so that it extends approximately into the normal forward direction of movement of the towing vehicle, and its upper trailing edge portion is angled with respect to the main portion of the plate so that it extends approximately opposite to the normal forward direction of movement of the towing vehicle. The leading and trailing angled portions of the deflector plate tend to rigidify the deflector plate and to keep it from bending or bowing under the force applied to it by the relative wind.

A pair of supporting brace assemblies are attached to the wind deflector plate at positions inwardly of the side edges of the deflector plate so that the line of support of the braces is located inwardly from the ends of the wind deflector plate and the resulting forces applied to the deflector plate by the relative wind moving about the vehicle tends to balance the deflector plate on opposite sides of its supporting braces to further limit the amount of bending or bowing of the deflector plate.

A tie rod is connected at its end to the support braces, mounting feet are connected to the support braces for engagement with the top of the towing vehicle, and connecting straps are connected between the side braces and the rain gutter, etc., of the towing vehicle.

Thus, it is an object of this invention to provide a wind deflector assembly which is simple in design and is inexpensive, and which functions to deflect the relative wind passing over the upper portion of a towing vehicle further in an upward direction about the protruding portions of the following towed vehicle.

Another object of this invention is to provide a wind deflector plate which is formed in a shape that assists in the streamlined deflection of the relative wind moving about the upper portion of a towing vehicle and which tends to rigidify the deflector plate.

Other objects, features and advantages of this invention will become more apparent upon reading the following specification, when taken in conjunction with the accompanying drawings.

BRIEF DESCRIPTION OF THE DRAWINGS

FIG. 1 is a partial perspective view of a portion of a towing vehicle, a towed vehicle, and a wind deflector assembly mounted on the towing vehicle.

FIG. 2 is a front elevational view of the wind deflector assembly.

FIG. 3 is a side and rear perspective view of the wind deflector assembly with portions broken away.

FIG. 4 is a detail of a mounting foot for the wind deflector assembly.

DETAILED DESCRIPTION

Referring now in more detail to the drawing, in which like numerals indicate like parts throughout the several views, FIG. 1 illustrates a towing vehicle 10, a towed vehicle 11 and the wind deflector assembly 12 mounted on the towing vehicle. While the drawing illustrates the towing vehicle as being a station wagon and to the towed vehicle 11 as a travel trailer, it will be understood that wind deflector 12 can be used with various combinations of towing and towed vehicles.

As is illustrated in FIG. 2, the wind deflector assembly 12 comprises an approximately rectangular deflector plate 14 with upper and lower edges 15 and 16 and side edges 17 and 18 and rounded corners. The deflector plate 14 can be fabricated from various suitable materials, including transparent plexiglass, opaque aluminum, etc. It is desirable, however, to fabricate the deflector plate 14 with relatively inexpensive lightweight material, but the deflector plate must have enough strength to resist excessive bending or bowing in response to the relative wind passing over the upper portion of the towing vehicle 10.

As is illustrated in FIGS. 1 and 3, the wind deflector plate 14 is mounted in an inclined position with its lower edge 16 positioned forwardly of its upper edge 15. The upper and lower edge portions 19 and 20 which are displaced inwardly from the upper and lower edges 15 and 16 are angled with respect to the larger flat central portion 21 of the deflector plate, and the lower leading edge portion extends approximately into the normal forward direction of movement of the towing vehicle 10 while the upper trailing edge portion 19 extends approximately opposite to the normal forward direction of movement of the towing vehicle. Thus, the wind deflector plate 14 is formed in a substantially flat S-shape.

As is illustrated in FIG. 3, a pair of triangular braces 22 and 24 are connected to the wind deflector plate 14 and function as mounting means for the wind deflector assembly. Each triangular brace includes three legs formed from L-shaped stock, with first legs 25a and 25b of the triangular braces each connected to the wind deflector plate 14, the second legs 26a and 26b each connected at one of its ends to the lower end of the first leg 25a and 25b, and the third legs 27a and 27b each connected at its ends to the ends of the legs 25a and 25b and 26a and 26b. The triangular braces 22 and 24 are substantially mirror images of each other, and the L-shaped legs 25a and 25b each have an angle of the leg positioned parallel to the facing surface of the deflector plate 14 and the legs 25a and 25b are connected adjacent their ends to the deflector plate by carriage bolts 29 extending through aligned holes in the deflector plate and in the legs 25a and 25b. The carriage bolts 29 each comprise a threaded screw 30 and a nut 31, and thick rubber grommets or washers 32 are positioned between the head of each screw 29 and the deflector plate 14, and between the deflector plate 14 and the triangular braces 22 and 24. The rubber grommets 32 therefore maintain the wind deflector plate 14 spaced from direct engagement with the triangular braces 22 and 24 and prevent the head of the carriage bolt from damaging the deflector plate. The ends of the legs 25a, 26a and 27a and 25b, 26b and 27b are connected to one another at their ends by bolts 34.

The lower legs 26a and 26b of each triangular brace 22 and 24 define slots 35a and 36a and 35b and 36b at their leading and trailing ends, and tie down straps 38a and 39a and 38b and 39b are threaded through the slots. Gutter hooks 40a and 40b are connected to the ends of the tie down straps for connection to the rain gutter of the towing vehicle.

Tie rod 41 extends between the trailing ends of the triangular braces 22 and 24 and is connected at its ends to the lower ends of the third leg 27a and 27b of the triangular braces. The tie rod 41 is bent at its ends (not shown), its ends are threaded, and butterfly nuts are threaded onto its ends. Both the tie rod 41 and the gutter hooks 40 are covered with soft plastic material.

Supporting feet 42a, 43a and 42b and 43b are connected to the second or lower horizontal legs 26a and 26b of the triangular braces 22 and 24. The supporting feet are illustrated in detail in FIG. 4, and each foot includes a flexible suction cup 45 which includes an internal nut 46, an externally threaded screw 47, and spacer 48. The screw 47 extends through the horizontal portion of the L-shaped lower horizontal leg 26a or 26b of a triangular braces 22 and 24, through the cylindrical spacer 48 and is threaded at its lower end into the internally threaded nut 46.

When the wind deflector assembly 12 is mounted on the upper surface of a towing vehicle 10, the supporting feet as illustrated in FIG. 4 engage the top of the towing vehicle 10, the gutter hooks are connected to the gutter which extends along the side edges of the roof of the towing vehicle, and the tie down straps are tightened. The force applied to the triangular braces 22 and 24 by the tie down straps causes the suction cups 45 of the support feet to collapse against the top surface of the towing vehicle, to expel any air trapped between the cups and the surface of the vehicle, and to firmly connect the wind deflector assembly to the towing vehicle.

When the wind deflector assembly is properly positioned on the towing vehicle, the wind deflector plate 14 will be positioned in an inclined attitude with respect to the horizontal. The attitude of the deflector plate can vary, depending on the size and particular design features of the assembly, and the shape and slope of the top surface of the towing vehicle. For example, one embodiment of the invention is designed so that the flat central portion 21 of the deflector plate is to be mounted at an angle of approximately 52° from the horizontal. The lower leading edge portion 20 extends approximately into the normal forward direction of horizontal movement of the vehicle and its gentle curve into the main body portion 21 of the wind deflector plate 14 tends to cause the wind to be deflected from an approximately horizontal relative direction upwardly in a direction approximately parallel to the main body portion 21 in a smooth transition. Again, when the wind flowing over the surface of the wind deflector plate 14 reaches the upper portion thereof, the gentle curve between the upper trailing edge portion 19 and the main body portion 21 tends to allow the wind to flow with little turbulence on beyond the deflector plate 14 and upwardly about the towed vehicle 11.

Since the triangular braces 22 and 24 are positioned inwardly from the side edges 17 and 18 of the deflector plate 14, the force of the relative wind engaging the deflector plate 14 on the opposite sides of the triangular braces 22 and 24 tends to balance the deflector plate about the braces and to minimize the force tending to cause the deflector plate to bow or bend. Moreover, the curved portions of the deflector plate tend to rigidify the deflector plate and the deflector plate therefore further resists the bending forces applied thereto by the relative wind.

The mounting feet (FIG. 4) have been illustrated with cylindrical spacers 48 for the purpose of elevating the deflector plate 14 with respect to the towing vehicle 10. It will be understood that the cylindrical space 48 can be removed from the assembly and shorter screws 47 be used so as to lower the wind deflector plate closer to the towing vehicle, or in a situation where the towing vehicle 10 has ribs or other protrusions on its top surface, such as the ribs of a luggage rack of a station wagon, longer or additional cylindrical spacers 48 can be used so that the lower edge 16 of the deflector plate does not engage the hard raised surfaces of the towing vehicle.

It will be understood by those skilled in the art that the particular apparatus here shown is by way of illustration only and is meant to be in no way restrictive; therefore, numerous changes and modifications may be made, and the full use of equivalents resorted to without departing from the spirit or scope of the invention as defined in the appended claims.

I claim:

1. In combination, a vehicle, a wind deflector assembly mounted on said vehicle and extending across the normal direction of forward movement of said vehicle, said wind deflector assembly comprising a deflector plate including a flat central portion positioned at an angle inclined upwardly and rearwardly with respect to the normal forward direction of movement of said vehicle and including a lower leading edge portion extending approximately into the normal forward direction of movement of said vehicle and an upper trailing edge portion extending approximately opposite the normal forward direction of movement of said vehicle, mounting means connected to said deflector plate and removably connected to said vehicle, said mounting means comprising a pair of triangular braces mounted on said vehicle and attached to the flat central portion of said deflector plate at positions displaced from the ends and from the upper and lower edge portions of the deflector plate leaving the end portions and upper and lower edge portions of the deflector plate free of said mounting means whereby the forces on the deflector plate by the wind deflected by the deflector plate tend to balance the deflector plate about its mounting means and the upper and lower edge portions of the deflector plate tend to rigidify the deflector plate, a tie rod connected at its ends to said triangular braces, support feet connected to and extending downwardly from triangular braces in engagement with said vehicle and supporting said deflector plate in spaced relationship with said vehicle, said strap means connected to said triangular braces for connection to said vehicle.

2. The combination of claim 1 and wherein each of said triangular braces includes a first leg positioned approximately parallel to the flat central portion of said deflector plate and inclined upwardly and rearwardly with respect to the normal forward direction of movement of said vehicle, a second leg connected at one end of its ends to the lower end of said first leg and extending opposite to the normal forward direction of movement of said vehicle, a third leg connected at one of its ends to the upper end of said first leg and at the other of its ends to the rear end of said second leg, and wherein said tie rod is connected at its ends to the lower portion of each of said third legs of said triangular braces.

3. The combination of claim 1 and wherein said deflector plate is curved adjacent its said lower leading edge portion and adjacent its said upper trailing edge portion.

4. In combination, a vehicle, a wind deflector assembly mounted on said vehicle and extending across the normal direction of forward movement of said vehicle, said wind deflector assembly comprising an approximately rectangular deflector plate including a flat central portion positioned at an angle inclined upwardly and rearwardly with respect to the normal forward direction of movement of said vehicle and including a lower leading edge portion extending approximately into the normal forward direction of movement of said vehicle and an upper trailing edge portion extending approximately opposite to the normal forward direction of movement of said vehicle and side edges positioned at opposite sides of the vehicle, and mounting means connected to said deflector plate and removably connected to said vehicle, said mounting means comprising a pair of mounting braces with each mounting brace positioned inwardly of the side edges of said deflector plate and connected to said deflector plate at positions inwardly of said lower and upper edge portions of said deflector plate, and means for connecting said mounting braces to said vehicle with the deflector plate freely supported by said mounting means in spaced relationship above said vehicle.

5. A wind deflector assembly for mounting on a vehicle, said wind deflector assembly comprising a deflector plate including a flat central portion for positioning at an angle inclined upwardly from the horizontal and rearwardly with respect to the normal forward direction of movement of the vehicle and including a lower leading edge portion angled with respect to said flat central portion for extending approximately into the normal forward direction of movement of the vehicle and an upper trailing edge portion angled with respect to said flat central portion away from said lower leading edge portion for extending approximately opposite to the normal forward direction of movement of the vehicle, mounting means connected to the flat central portion of said deflector plate and for removable connection to said vehicle, said mounting means comprising a pair of triangular braces attached to said deflector plate at positions displaced from the ends of the deflector plate leaving the ends of the deflector plate free of and extending outwardly beyond said mounting means whereby when the wind deflector assembly is mounted on a moving vehicle the forces of the wind deflected by the end portions of the deflector plate outside said mounting means tend to balance the forces of the wind deflected by the central portion of the deflector plate between said mounting means, a tie rod connected at its ends to said triangular braces, support feet connected to said extending downwardly from said triangular braces for engagement with the vehicle and for supporting said deflector plate in free spaced relationship above the vehicle, and strap means connected to said triangular braces for connection to the vehicle.

* * * * *